UNITED STATES PATENT OFFICE.

ROBERT A. CARTER, OF PITTSBURG, PENNSYLVANIA.

ART OF PUDDLING IRON.

SPECIFICATION forming part of Letters Patent No. 623,654, dated April 25, 1899.

Application filed April 8, 1898. Serial No. 676,958. (No specimens.)

*To all whom it may concern:*

Be it known that I, ROBERT A. CARTER, a citizen of the United States, residing at Pittsburg, in the county of Allegheny and State of Pennsylvania, have invented or discovered certain new and useful Improvements in the Art of Puddling Iron, of which improvements the following is a specification.

The invention described herein relates to certain improvements in the process of manufacturing wrought-iron, and has for its object a more thorough removal or elimination of the phosphorus and other impurities from the metal during the puddling operation.

The invention is hereinafter more fully described and claimed.

Prior to the treatment of the charge wrought-iron scrap is placed in the furnace and melted and then allowed to harden to form what is known as a "scrap-cinder bottom." After the formation of this bottom the sides of the furnace are lined with iron ore. Previous to charging in the pig metal to be treated the bottom of the furnace is covered with iron ore or manganese ore or a mixture of iron and manganese ores. The quantity of ore thus placed in the furnace is based upon the amount, by weight, of the metal to be treated, being usually equal to five per cent. of the charge; but this quantity can be varied within considerable limits without departing from the spirit of the invention. The iron or manganese ore is preferably ground up fine before being spread over the furnace-bottom. The addition of the ore will render the cinder highly basic in character, in which condition it will combine with and retain a very large percentage of the phosphorus, silicon, and sulfur of the metal to be treated. Upon this bed of ore a quantity of finely-cut wrought-iron or steel scrap, or a mixture thereof equal, by weight, to about five per cent., more or less, of the charge to be treated, is spread over the bed of ore. The pig metal is then placed in the furnace, melted, stirred, and boiled in the usual manner. The addition of the wrought-iron or steel scrap being very low in or practically free from silicon, phosphorus, sulfur, &c., will reduce the average amount of such impurities in the total charge, and, further, as such scrap has a higher melting-point than the pig metal the melted metal will contain for a considerable time a quantity of solid pieces of metal which will be disseminated through the charge by the stirring-tool. The movement of these solid pieces of metal will increase the agitation of the molten metal and effect such an opening up of the charge as to facilitate the elimination of the silicon, sulfur, &c., by subjecting it to the direct action of the reducing-flame. After the metal has commenced to boil, which will be indicated by the production of sparks from its surface, a sufficient quantity of spiegeleisen or ferromanganese is charged into the furnace to render the cinder so fluid that its separation from the iron can be readily effected by the subsequent treatment of the charge, as stirring, balling, and squeezing, and to effect a recarburization of the bath. The employment of spiegeleisen or ferromanganese affords a convenient means for effecting a desirable recarburization of the charge, the carbon originally contained in the metal having been nearly eliminated during the treatment necessary to remove the silicon, phosphorus, sulfur, &c. Experience has shown that the addition of an amount of spiegeleisen or ferromanganese equal to about one and one-half per cent., by weight, of the metal charged will render the cinder sufficiently fluid for its easy separation from the iron and to effect the desired recarburization. The invention is not, however, limited to such proportions, as the condition of the iron and the cinder, as the metal begins to come to nature, may necessitate the use of a greater or less amount of the spiegeleisen or ferromanganese. The addition of either of these materials will not only produce the beneficial results above stated, but will render the cinder capable of taking up additional quantities of phosphorus, &c., thereby further purifying the bath. After the spiegeleisen or ferromanganese has been added the charge is stirred, balled, and squeezed or otherwise operated on to remove the cinder, an approximately uniform heat being maintained during this treatment. During the treatment subsequent to the addition of the spiegeleisen or ferromanganese a partial removal of the carbon thus added to the bath is effected; but care should be taken to prevent any greater decarburization than is necessary to permit of the balling of the metal.

It is characteristic of the process herein described that the metal can be brought to nature without the addition to the charge of cinder or other impurities, as has heretofore been the practice.

I claim herein as my invention—

1. As an improvement in the art of puddling iron, the method herein described, which consists in lining the bottom with iron scrap-cinder and its sides with iron ore, covering the scrap-cinder with iron ore, charging the metal to be treated on the hearth, melting and boiling it to decarburize and remove the sulfur, phosphorus and other impurities, adding spiegeleisen or ferromanganese and finally stirring and balling the charge while held at an approximately uniform temperature, substantially as set forth.

2. As an improvement in the art of puddling iron, the method herein described, which consists in lining the bottom with iron scrap-cinder, and its sides with iron ore, covering the scrap-cinder with iron ore and the latter with finely-cut wrought-iron or steel scrap, charging the metal to be treated, melting and boiling the charge to decarburize and to remove the sulfur, phosphorus and other impurities, adding spiegeleisen or ferromanganese and finally stirring and balling the charge while held at an approximately uniform temperature, substantially as set forth.

In testimony whereof I have hereunto set my hand.

ROBERT A. CARTER.

Witnesses:
 DARWIN S. WOLCOTT,
 F. E. GAITHER.